US011933314B2

(12) United States Patent
Schön et al.

(10) Patent No.: US 11,933,314 B2
(45) Date of Patent: Mar. 19, 2024

(54) COMPRESSOR WHEEL

(71) Applicant: BorgWarner Inc., Auburn Hills, MI (US)

(72) Inventors: Martin Schön, Fürfeld (DE); Markus Eisenbarth, Mainz-Kastel (DE); Manfred Krämer, Kaiserslautern (DE)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 17/897,774

(22) Filed: Aug. 29, 2022

(65) Prior Publication Data

US 2023/0193921 A1 Jun. 22, 2023

(30) Foreign Application Priority Data

Dec. 18, 2021 (DE) ......................... 102021133773.9

(51) Int. Cl.
*F04D 29/28* (2006.01)
*F04D 17/10* (2006.01)

(52) U.S. Cl.
CPC ........... *F04D 29/284* (2013.01); *F04D 17/10* (2013.01); *F05D 2220/40* (2013.01); *F05D 2230/10* (2013.01)

(58) Field of Classification Search
CPC .. F04D 29/284; F04D 17/10; F04D 17/08–14; F04D 29/22; F04D 29/2205;
(Continued)

(56) References Cited

U.S. PATENT DOCUMENTS 4,596,501 A * 6/1986 Wu ........................... B23C 3/18 409/84
5,215,439 A 6/1993 Jansen et al.
(Continued)

FOREIGN PATENT DOCUMENTS

DE 10 2011 079 254 A1 10/2012
DE 102011079254 A1 10/2012
(Continued)

OTHER PUBLICATIONS

Machine-assisted English language abstract and machine-assisted English language translation for DE 10 2011 079 254 A1 extracted from espacenet.com database on Aug. 31, 2022, 12 pages.
(Continued)

*Primary Examiner* — Mark A Laurenzi
*Assistant Examiner* — Xiaoting Hu
(74) *Attorney, Agent, or Firm* — Howard & Howard Attorneys PLLC

(57) ABSTRACT

A compressor wheel for a compressor of a turbocharger has a hub and a multiplicity of blades on the hub. In intermediate spaces of the multiplicity of blades, a channel is in each case formed between a suction side and a pressure side. The channel guides fluid that flows in axially in relation to a rotation axis radially or radially-axially outward. The hub in relation to the rotation axis is contoured such that the hub has a rotationally symmetrical portion and a non-rotationally symmetrical portion. On the non-rotationally symmetrical portion, a transition between the hub and each of the blades is embodied with a radiused connection and facing the suction side has a region of modified thickness. A region formed by control rays is generated in at least one channel between the suction side and the pressure side on the hub. A method produces the compressor wheel.

16 Claims, 6 Drawing Sheets

(58) Field of Classification Search
CPC ............. F04D 29/2211; F04D 29/2216; F04D 29/2222; F04D 29/2238; F04D 29/2255; F04D 29/28; F05D 2220/40; F05D 2230/10
See application file for complete search history.

(56) References Cited

U.S. PATENT DOCUMENTS

| | | | | |
|---|---|---|---|---|
| 7,465,155 | B2 | 12/2008 | Nguyen | |
| 8,721,287 | B2 | 5/2014 | Billotey et al. | |
| 9,951,787 | B2 | 4/2018 | De Santis et al. | |
| 9,988,907 | B2 | 6/2018 | Xu | |
| 10,689,982 | B2 | 6/2020 | Soeguet et al. | |
| 10,830,070 | B2 | 11/2020 | Bennington | |
| 11,473,429 | B2 | 10/2022 | Akimoto | |
| 2007/0134086 | A1 | 6/2007 | Higashimori et al. | |
| 2013/0164137 | A1 | 6/2013 | Barnes et al. | |
| 2015/0125302 | A1* | 5/2015 | Roberto | F04D 17/00 416/183 |
| 2018/0313366 | A1* | 11/2018 | Lehmayr | B23C 3/00 |
| 2020/0217204 | A1 | 7/2020 | Schiebel et al. | |

FOREIGN PATENT DOCUMENTS

| | | | |
|---|---|---|---|
| DE | 10 2012 106 810 | A1 | 1/2014 |
| DE | 102012106810 | A1 | 1/2014 |

OTHER PUBLICATIONS

English language abstract for DE 10 2012 106 810 A1 extracted from espacenet.com database on Aug. 31, 2022, 2 pages.

* cited by examiner

COMPRESSOR WHEEL

CROSS-REFERENCE TO RELATED APPLICATIONS

This application claims priority pursuant to 35 U.S.C. 119(a) to German Patent Application No. 102021133773.9 filed Dec. 18, 2021, which application is incorporated herein by reference in its entirety.

BACKGROUND

The invention relates to a compressor wheel, in particular for a compressor of an exhaust turbocharger.

Charging devices in the form of exhaust turbochargers in which a turbine wheel drives a compressor wheel of a compressor are known from the general prior art. The turbine wheel and the compressor wheel are disposed on a common rotor which is rotatably guided in a bearing housing. The turbine wheel is driven by a flow of exhaust gas. The compressor is disposed in the induction duct of an internal combustion engine.

Compressor wheels nowadays are usually produced by milling. Used to this end are, for example, five-axis machining stations which enable also the machining by milling of complex structures on the compressor wheels.

Known milled compressor wheels have an axially symmetrical hub. Variable radiusing, which can improve the durability or service life of a compressor wheel, is used in the transition between the hub and the blades here. However, variable radiusing is very complex in terms of manufacturing technology, because the production thereof is very time-consuming, which manifests itself in additional milling paths. Radiused features of this type in the transition to the blades are often also referred to as blade connection radius.

A rotor for a fluid power machine in the form of an exhaust turbocharger having a hub and a multiplicity of rotor blades about which a medium flow through the exhaust turbocharger can flow is known from DE 10 2012 106 810 A1, wherein a blade channel is in each case configured between two rotor blades positioned next to one another, the blade channel having a blade channel length which extends in the axial direction of the rotor, wherein each rotor blade is connected to the hub by way of a first transition region, having at least one curvature, and a second transition region, having at least one second curvature, wherein a blade channel base of the blade channel between the first transition region and the second transition region at least in regions is configured so as to be variable, and wherein the blade channel base is at least partially designed so as to be adaptable to a face configured so as to be largely flat, wherein the face is configured so as to be inclined in relation to a tangential face of the hub, and conjointly with the tangential face of the hub encloses an angle, wherein a section line between the face and the tangential face of the hub determines an overall length of the face that extends in the circumferential direction of the hub.

Known from DE 10 2011 079 254 A1 is a compressor wheel for an exhaust turbocharger, which has a hub having centrally disposed therein a hub bore, a wing which in the radial direction adjoins the hub toward the outside and configures a wheel back, and has compressor blades disposed on the wing and the hub. In the region of the hub and/or in the region of the wheel back and/or in the transition regions of the compressor blades to the hub and the wing, internal stress is incorporated in the material of the compressor wheel.

SUMMARY

Proceeding from this prior art, the inventors have set the object of achieving a compressor wheel, in particular for a compressor of a turbocharger, as well as a method for producing a compressor wheel, by way of which the service life of a compressor wheel can be further increased.

This object is achieved by the features of independent patent claims 1 and 8. Further advantageous design embodiments of the invention are in each case the subject matter of the dependent claims. These design embodiments can be combined with one another in a technologically expedient manner. The description, in particular in conjunction with the figures, characterizes and specifies the invention further.

Set forth according to the invention is a compressor wheel, in particular for a compressor of a turbocharger, which has a hub and a multiplicity of blades on the hub, wherein in intermediate spaces of the multiplicity of blades a channel is in each case formed between a suction side and a pressure side, the channel guiding fluid that flows in axially in relation to a rotation axis radially or radially-axially outward, wherein the hub in relation to the rotation axis is contoured such that the hub has a rotationally symmetrical portion and a non-rotationally symmetrical portion, wherein on the non-rotationally symmetrical portion a transition between the hub and each of the blades is embodied with a radiused connection and facing the suction side has a region of modified thickness, wherein generated in at least one channel between the suction side and the pressure side on the hub is a region formed by control rays.

Accordingly, in comparison to previous blade connections having a variable radius in the case of a rotationally symmetrical hub, a non-rotationally symmetrical hub in which the blade connection is embodied having a preferably constant radius is henceforth used. Instead of using variable radiusing, a contoured hub having two regions is now used. Besides the portion that is rotationally symmetrical to the rotation axis, the non-rotationally symmetrical portion as a tangential transition is used to the now constant radiusing of the blade of the compressor wheel. The hub in the non-rotationally symmetrical portion is correspondingly raised or lowered by a region of modified thickness on the suction side such that a quasi-orthogonal surface can be achieved by means of the raising or the lowering close to the suction side. In the formation of the region formed by control rays, potential stress arising in the material of the compressor wheel is reduced by the raising in the region of greater thickness. The milling steps performed in the production of the compressor wheel generate corresponding milling lines having elevations and depressions which, also in the region of the hub, lie between the suction side and the pressure side and therein form a roughened surface. The raising of the surfaces conjointly with the smoothing of the latter overall reduces stress arising in the material of the compressor wheel such that an increased service life of the compressor wheel is derived. The increased service life can be utilized for operating the applications over a correspondingly long service life. However, an increase in the rotating speed may also take place, or a higher pressure may be generated by improved aerodynamics, without any loss of service life. It would likewise be conceivable for more cost-effective materials to be used without having to risk a compromised service life.

According to one embodiment of the invention, the region formed by control rays at least partially covers the non-rotationally symmetrical portion.

According to the invention, it is not necessary for the region formed by control rays to be configured completely between the suction side and the pressure side on the hub. It has been demonstrated to suffice that at least the region of modified thickness that forms the non-rotationally symmetrical portion is correspondingly machined, for example flank-milled or ground.

According to one further embodiment of the invention, the region formed by control rays reduces elevations of machining by milling.

In this way, the elevations can be removed as remnants of point milling. The elevations are also present in a region that is between the suction side and the pressure side on the hub and has high pressure loads when a flow of fluid passes through, such that the elevations are reduced or completely removed by the formation of the region formed by control rays.

According to one further embodiment of the invention, the region formed by control rays on the hub has a radial length which is between 5% and 70% of the length of the blade along the foot of the latter.

The region formed by control rays, proceeding radially from the outside, only partially covers the blade and is thus configured only in the outer peripheral region of the hub. This can be carried out using a conventional milling cutter or a grinding tool.

According to one further embodiment of the invention, the region formed by control rays on the hub spans the channel between adjacent blades from 40% of the passage width of the channel up to 100% of the passage width of the channel.

Complete machining by the milling flank is also not required in a direction perpendicular thereto. However, proceeding from the transition to the suction side, where the non-rotationally symmetrical portion is located, machining should take place over at least 40% of the width of the channel between the suction side and the pressure side on the hub.

According to one further embodiment of the invention, the region formed by control rays on the hub has a radius in the transition to the rotationally symmetrical portion.

The transition from the non-rotationally symmetrical portion to the rotationally symmetrical portion should take place in an ideally uniform and stepless manner, which can be achieved in particular by a large radius.

Moreover set forth is a charging device in a vehicle, wherein the charging device has a compressor having a compressor wheel as described above.

A charging device of this type can be provided as a VTG (variable turbine geometry) charger. However, a compressor wheel according to the invention can also be used in an electrically assisted turbocharger (also referred to as an E-Turbo) or an electrically driven compressor. Besides the use in a charging device, the compressor wheel according to the invention can also be used in an air supply to a fuel cell or else in a recuperation fan of a fuel cell.

Finally set forth is a method for producing a compressor wheel, in particular for a compressor of a turbocharger, which has a hub and a multiplicity of blades on the hub, wherein in intermediate spaces of the multiplicity of blades a channel is in each case formed between a suction side and a pressure side, the channel guiding fluid that flows in axially in relation to a rotation axis radially or radially-axially outward, wherein the hub in relation to the rotation axis is contoured such that the hub has a rotationally symmetrical portion and a non-rotationally symmetrical portion, wherein on the non-rotationally symmetrical portion a transition between the hub and each of the blades is embodied with a constant radiused connection, wherein generated between the suction side and the pressure side on the hub is a region formed by control rays.

According to one embodiment of the method according to the invention, one or a plurality of further intermediate spaces of the multiplicity of blades are subsequently successively machined so as to achieve, in particular by flank milling or using a grinding disk, one or a plurality of further regions formed by control rays.

According to one embodiment of the method according to the invention, elevations of machining by milling previously created are reduced or completely removed by the flank milling.

BRIEF DESCRIPTION OF THE DRAWINGS

A number of exemplary embodiments will be explained in more detail hereunder by means of the drawing, in which.

In the figures, identical or functionally equivalent components are provided with the same reference signs.

DETAILED DESCRIPTION

Figure 1:
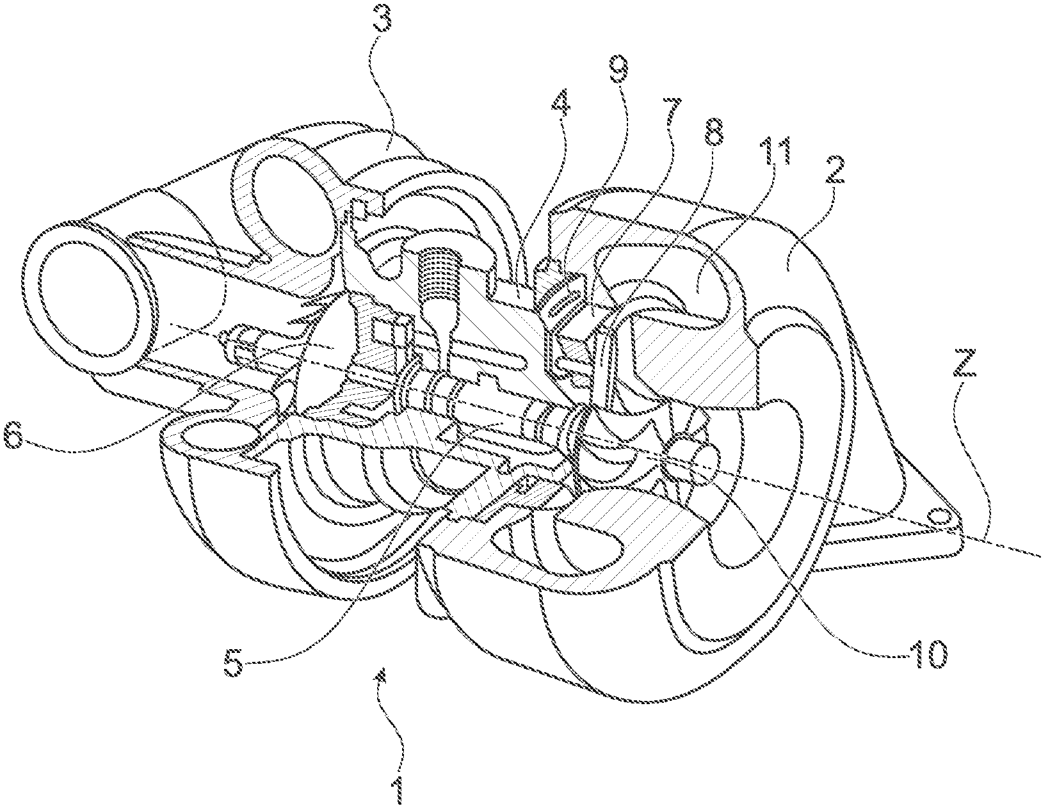
FIG. 1 shows a charging device for an internal combustion engine in a sectional illustration.

Firstly, a charging device 1 in which a design embodiment of a compressor wheel according to the invention can preferably be used will be schematically described hereunder by means of FIG. 1. FIG. 1 in a sectional view here shows the charging device 1 only in a highly schematic manner in order to be able to illustrate the position of the individual components. Charging devices 1 of this type are known per se from the prior art.

FIG. 1 shows a perspective, partially sectional view of a charging device 1 according to the invention. The charging device 1 has a turbine housing 2 and a compressor housing 3 connected to the turbine housing 2 via a bearing housing 4. The turbine housing 2, the compressor housing 3 and the bearing housing 4 are disposed along an axis Z. The turbine housing 2 is shown in a partially sectional view. The shaft 5 here connects a turbine wheel 10 to a compressor wheel 6. A variable turbine geometry, which has a plurality of adjustable blades 8 that are distributed across the circumference and have corresponding rotation axes, is disposed on the turbine side by means of a blade bearing ring 7. As a result, nozzle cross sections are formed which are larger or smaller depending on the position of the adjustable blades 8 and via which the exhaust gas of an engine supplied via a supply duct 11 and discharged via a central port impinges to a greater or lesser extent the turbine rotor 10 situated in the center on the axis Z, in order, via the turbine rotor 10, to drive the compressor wheel 6. To control the movement or the position of the adjustable blades 8, an activation installation or an actuator is provided, which may be designed for example as an electric actuator or as a pneumatic actuator. The activation installation can set in a slight rotating movement an adjustment ring 9 which lies behind the blade bearing ring 7.

It goes without saying that a charging device 1, as is schematically illustrated in FIG. 1 for the purpose of explanation, comprises even further components in order to be able to be used in an internal combustion engine. A charging device 1 of this type is also referred to as a VTG (variable turbine geometry) charger. The design embodiment of the compressor wheel 6 according to the invention, which can be used in the charging device 1, will now be described in more detail. However, a compressor wheel 6 according to the invention can also be used in an electrically assisted turbocharger (also referred to as an E-Turbo) or an electrically driven compressor. Besides the use in a charging device, the compressor wheel 6 according to the invention can also be used in an air supply to a fuel cell or else in a recuperation fan of a fuel cell.

Figure 2:
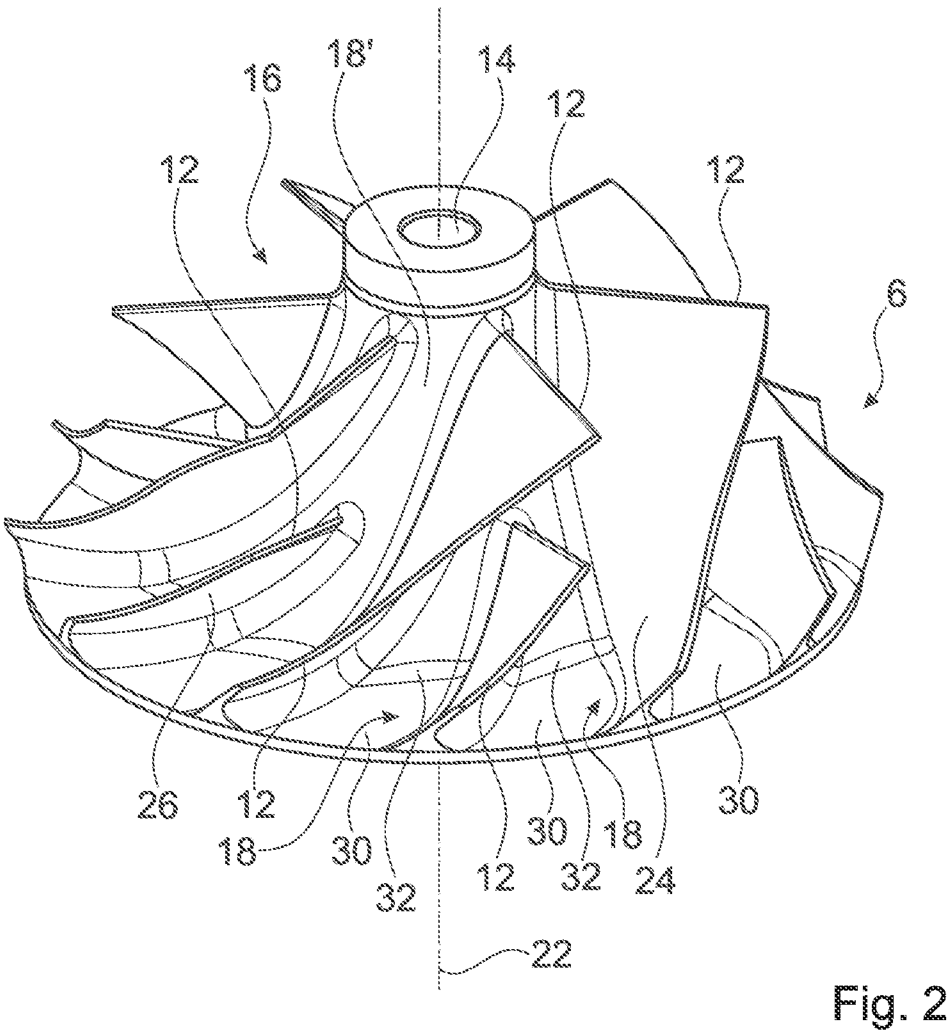
FIG. 2 shows an embodiment of a compressor wheel according to the invention in a perspective lateral view.

The compressor wheel 6 is illustrated in a perspective lateral view in FIG. 2. It can be seen that the compressor wheel 6 has rotor blades or blades 12 which are preferably equidistantly spaced apart and disposed on a hub 16 provided with a bore 14.

The hub 16 has a rotationally symmetrical portion and a non-rotationally symmetrical portion. The non-rotationally symmetrical portion in FIG. 2 is identified by means of the reference sign 18. The term "rotationally symmetrical" here refers to the rotation axis 22 which is established in the center of the bore 14 through the shaft. The non-rotationally symmetrical portion 18 is raised in this example. This here is thus a region of a modified, here a greater, thickness such that the hub is thickened in comparison to the planar rear side 20. However, the non-rotationally symmetrical portion 18 may also be lowered such that this is a region having a decreased thickness.

The rotationally symmetrical portion 18' and the non-rotationally symmetrical portion 18 of the hub 16 are formed in milling processes. The rotationally symmetrical portion 18' will typically be milled by punctiform contact, and the non-rotationally symmetrical portion 18 will typically be flank-milled. The thickening about the non-rotationally symmetrical portion 18 in the compressor wheel 6 according to the invention is aligned on the suction side of the blade 12.

The side which is visible, or lies on the top, when viewed from the inflow direction of the compressor wheel is referred to as the suction side of the blade 12, while the opposite side is referred to as the pressure side of the blade 12. The suction side is provided with the reference sign 24 in FIG. 2, while the pressure side is provided with the reference sign 26.

As is shown in FIG. 2, a region 30 which is formed by control rays and which toward the rotation axis 22 opens into a transition 32 and lies in the non-rotationally symmetrical portion 18 is configured in the channel between the suction side 24 and the pressure side 26 on the hub 16, the region 30 having the region of greater thickness. A region 30 formed by control rays here is understood to be a free-form surface or control face which by the movement of a straight shank of the milling cutter is generated as a curve on the workpiece surface. Since the curve generated here is a straight line, a control face is created by the movement of the latter. The discrete positions of the straight line on the face, for example according to specific milling positions or temporal intervals, are referred to hereunder as control rays.

As has already been mentioned, the region 30 formed by control rays can be formed by milling using a flank of the tool. However, in terms of production technology, it is also possible for the region 30 formed by control rays to be generated in another way, for example by a grinding disk.

By virtue of the quasi-orthogonal surface, the region 30 formed by control rays can be flank-milled, for example. Potential stress in the material of the compressor wheel 6 in the region of greater or modified thickness is reduced by means of raising close to the suction side 24. The milling steps carried out in the production of the compressor wheel 6 generate corresponding milling lines having elevations and depressions which are reduced or completely removed in the region 30 formed by control rays.

It is not necessary for the region 30 formed by control rays to be configured completely between the suction side 24 and the pressure side 26 on the hub 16. It has been demonstrated to suffice that at least the region of greater thickness that forms the non-rotationally symmetrical portion 18 is flank-milled.

Figure 3A:
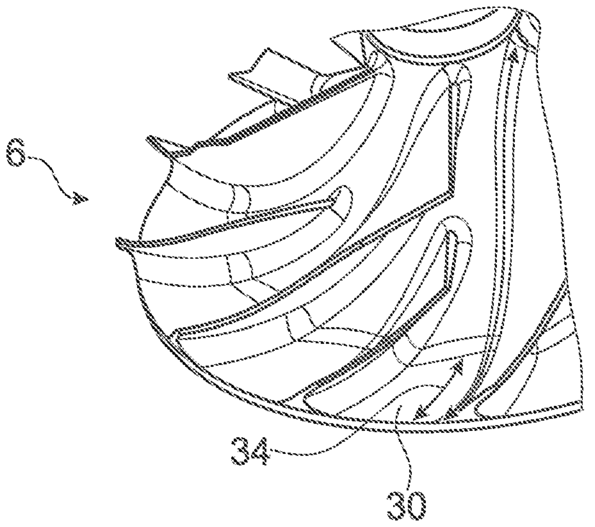
FIG. 3A shows the compressor wheel according to the invention from FIG. 2 in a detailed view.

It is shown with reference to FIG. 3A that the flank-milled region on the hub has a radial length 34 which is between 5% and 70% of the length of the blade 12. The radial length 34 here refers to the main blade which in FIG. 2 is the larger one of the two different blades. The flank-milled region 30, proceeding radially from the outside, only partially covers the blade 12 and is thus configured only in the outer peripheral region of the hub 16.

Figure 3B:
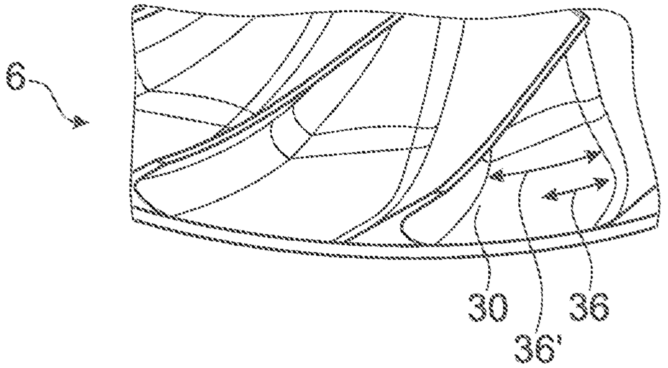
FIG. 3B shows the compressor wheel according to the invention from FIG. 2 in a further detailed view.

It is shown with reference to FIG. 3B that the flank-milled region 30 on the hub 16 spans the channel between adjacent blades 12 from at least 40% of the passage width 36 of the channel, or up to 100% of the passage width 36' of the channel. Complete machining by the milling flank is also not required in the direction perpendicular to the radial direction. However, proceeding from the transition to the suction side 24, where the non-rotationally symmetrical portion 18 is located, machining should take place over at least 40% of the width of the channel between the suction side 24 and the pressure side 26 on the hub 16.

Figure 3C:
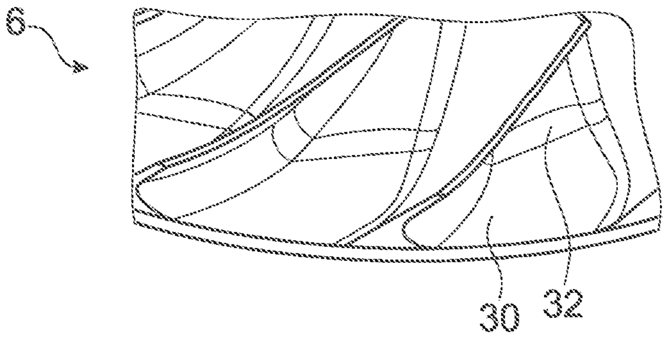
FIG. 3C shows the compressor wheel according to the invention from FIG. 2 in a further detailed view.

It is shown with reference to FIG. 3C that the region 30 formed by control rays on the hub 16 has an ideally large radius in the transition 32 to the rotationally symmetrical portion 18'. The transition 32 from the non-rotationally symmetrical portion 18 to the rotationally symmetrical portion 18' should take place in an ideally uniform and stepless manner, which can be achieved in particular by a large radius.

Figure 4:
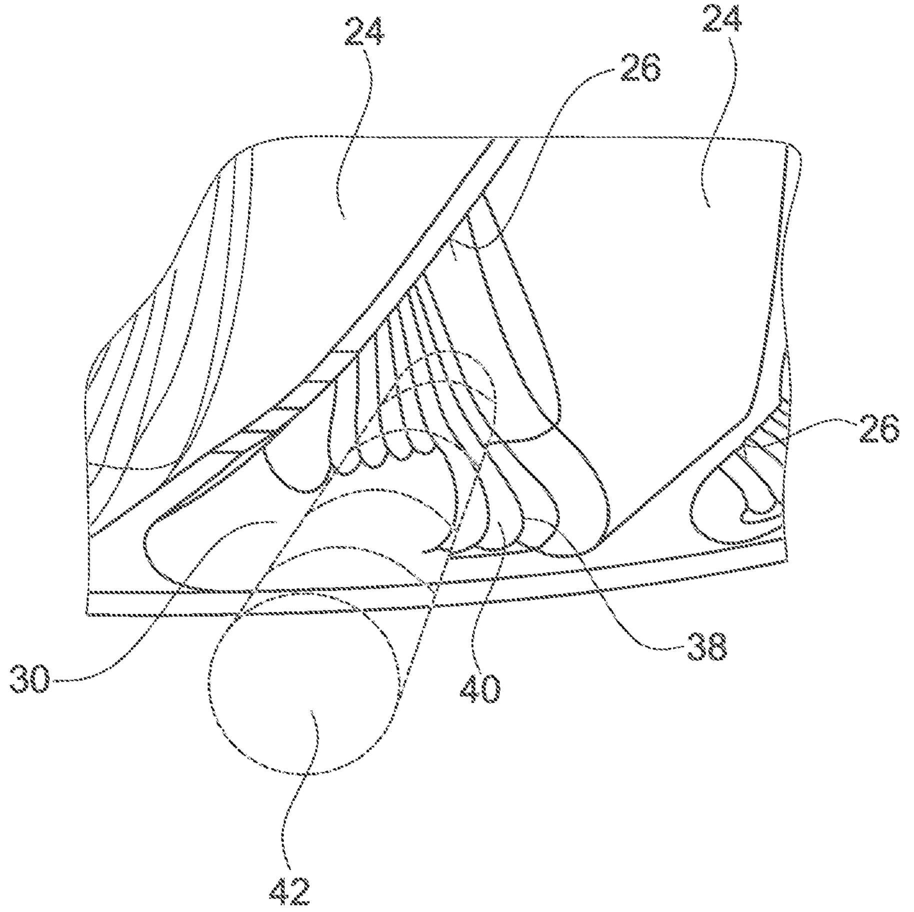
FIG. 4 shows the compressor wheel according to the invention from FIG. 2 in a perspective lateral view.

As has already been mentioned, the elevations as remnants of point milling can be removed, this being yet again explained in more detail with reference to FIG. 4. The region 30 formed by control rays reduces elevations 38 of the milling peaks or depressions 40 of the milling troughs during machining by milling. The elevations and depressions are also present in a region that is between the suction side 24 and the pressure side 26 on the hub 16 and has high pressure loads when a flow of fluid passes through, such that the elevations are reduced or completely removed by the formation of the region 30 formed by control rays and machined by a milling cutter 42.

Figure 5A:
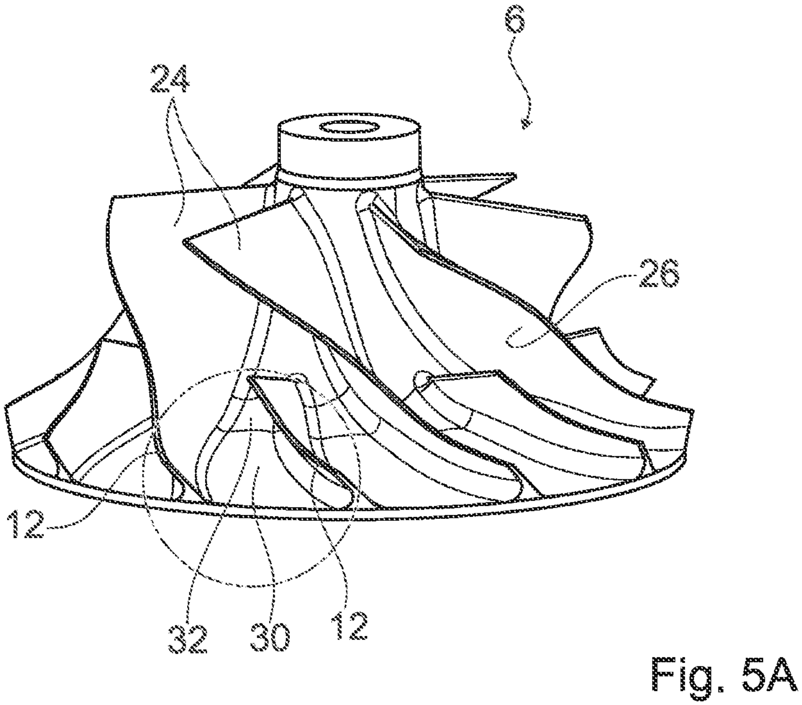
FIG. 5A shows a further compressor wheel according to the invention in a perspective lateral view.
Figure 5B:
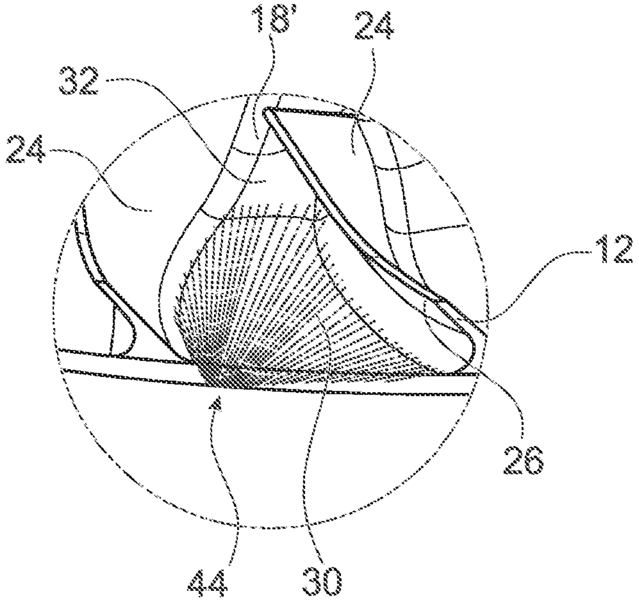
FIG. 5B shows a detail of the compressor wheel from FIG. 5A in a perspective lateral view.

A further compressor wheel 6 according to the invention is shown in FIG. 5A, and a detail of the compressor wheel 6 is shown in FIG. 5B, in each case in a perspective lateral view. It can be seen that this compressor wheel 6 in comparison to the previous example has a region 30 formed by control rays that reaches farther in the direction of the rotation axis. Moreover, the transition 32 between the region 30 formed by control rays to the rotationally symmetrical region 18' is formed as a radius. It is furthermore evident that the multiplicity of control rays 44 (plotted as chain-dotted lines in FIG. 5B) of the region 30 formed by the control rays in this example are disposed in the shape of a fan. Only the hub 16 is thickened in this construction, i.e. the non-rotationally symmetrical face lies higher than the original hub face.

Figure 6A:
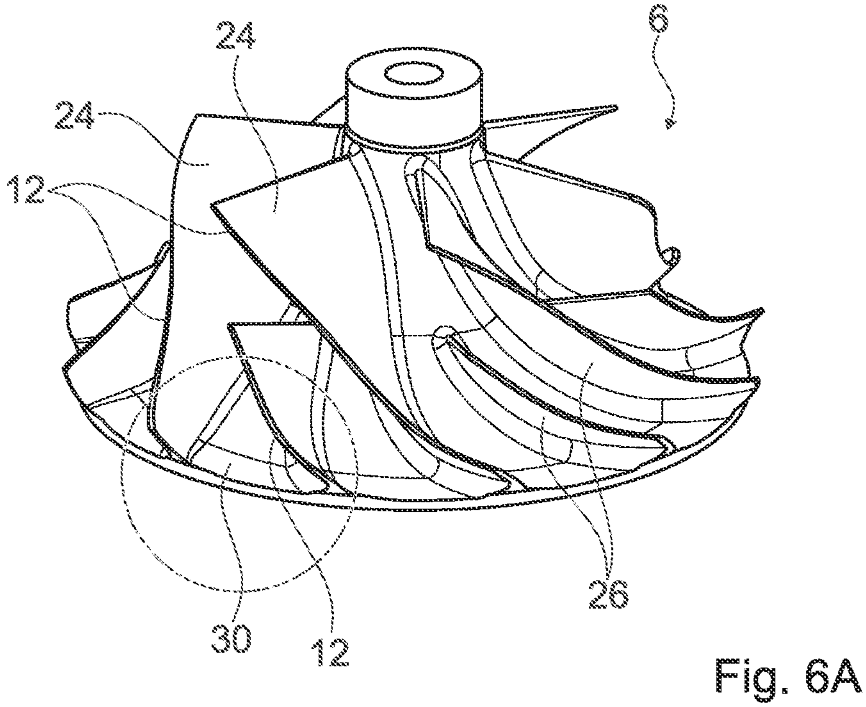
FIG. 6A shows a further compressor wheel according to the invention in a perspective lateral view.
Figure 6B:
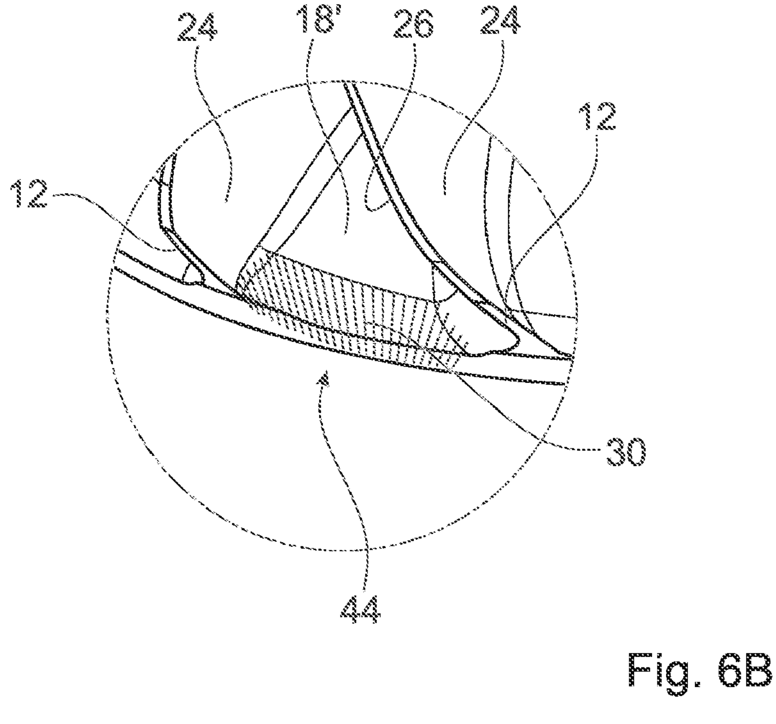
FIG. 6B shows a detail of the compressor wheel from FIG. 6A in a perspective lateral view.

A further compressor wheel 6 according to the invention is shown in FIG. 6A, and a detail of the compressor wheel 6 is shown in FIG. 6B, in each case in a perspective lateral view. The region 30 formed by control rays 44, the latter in FIG. 6B again being plotted as chain-dotted lines, proceeding from the external periphery here is kept significantly shorter, and becomes thicker toward the suction side 24 and thinner toward the pressure side 26 than the original hub profile. The rotationally symmetrical region 18' deviates somewhat from the original profile, wherein the transition face here is not embodied as a radius but as a free-form surface which merges with the rotationally symmetrical region 18' and lies largely below the original hub contour. The height differential between the suction side 24 and the pressure side 26 is most evident at the connection to the region 30 formed by control rays.

In FIGS. 5A and 6B, all channels between the suction side 24 and the pressure side 26 are configured by a region 30 formed by control rays. It is provided according to the invention that individual channels as well as all channels of the compressor wheel 6 are embodied by regions 30 formed by control rays, wherein the regions 30 may also be of dissimilar designs.

The features specified above and in the claims and shown in the figures can be advantageously implemented both individually and in various combinations. The invention is not restricted to the exemplary embodiments described, but may be modified in various ways within the scope of the abilities of a person skilled in the art.

LIST OF REFERENCE SIGNS

1 Charging device
2 Turbine housing
3 Compressor housing
4 Bearing housing
5 Shaft
6 Compressor wheel
7 Blade bearing ring
8 Adjustable blades
9 Adjusting ring
10 Turbine wheel
11 Supply duct
12 Blade
14 Bore
16 Hub
18 Non-rotationally symmetrical portion
18' Rotationally symmetrical portion
20 Rear side
22 Rotation axis
24 Suction side
26 Pressure side
30 Region formed by control jets
32 Transition
34 Length
36, 36' Passage width
38 Elevations
40 Depressions
42 Milling cutter
44 Control rays

What is claimed is:

1. A compressor wheel for a compressor of a turbocharger, the compressor wheel comprising a hub and a multiplicity of blades on the hub, wherein in intermediate spaces of the multiplicity of blades a channel is in each case formed between a suction side and a pressure side, the channel guiding fluid that flows in axially in relation to a rotation axis and radially or radially-axially outward, wherein the hub in relation to the rotation axis is contoured such that the hub has a rotationally symmetrical portion and a non-rotationally symmetrical portion, wherein on the non-rotationally symmetrical portion a transition between the hub and each of the blades is embodied with a radiused connection and facing the suction side has a region of modified thickness, wherein in at least one channel between the suction side and the pressure side on the hub there is configured a region extending between a peripheral edge of the hub and the transition, and wherein the region extending between the peripheral edge of the hub and the transition is defined by a multiplicity of linear control rays arranged at discrete positions within the at least one channel between the suction side and the pressure side on the hub.

2. The compressor wheel as claimed in claim 1, wherein the region defined by the multiplicity of linear control rays on the hub at least partially covers the non-rotationally symmetrical portion.

3. The compressor wheel as claimed in claim 2, wherein the region defined by the multiplicity of linear control rays on the hub reduces milling peaks of machining by milling that are present as elevations.

4. The compressor wheel as claimed in claim 2, wherein the region defined by the multiplicity of linear control rays on the hub has a radial length which is between 5% and 70% of the length of the blade.

5. The compressor wheel as claimed in claim 2, wherein the region defined by the multiplicity of linear control rays on the hub spans the channel between adjacent blades from 40% of the passage width of the channel up to 100% of the passage width of the channel.

6. The compressor wheel as claimed in claim 2, wherein the region defined by the multiplicity of linear control rays on the hub has a radius in the transition to the rotationally symmetrical portion.

7. The compressor wheel as claimed in claim 1, wherein the region defined by the multiplicity of linear formed by control rays on the hub reduces milling peaks of machining by milling that are present as elevations.

8. The compressor wheel as claimed in claim 1, wherein the region defined by the multiplicity of linear formed by control rays on the hub has a radial length which is between 5% and 70% of the length of the blade.

9. The compressor wheel as claimed in claim 8, wherein the region defined by the multiplicity of linear control rays on the hub spans the channel between adjacent blades from 40% of the passage width of the channel up to 100% of the passage width of the channel.

10. The compressor wheel as claimed in claim 1, wherein the region defined by the multiplicity of linear control rays on the hub spans the channel between adjacent blades from 40% of the passage width of the channel up to 100% of the passage width of the channel.

11. The compressor wheel as claimed in claim 1, wherein the region defined by the multiplicity of linear control rays on the hub has a radius in the transition to the rotationally symmetrical portion.

12. A charging device in a vehicle comprising a compressor having the compressor wheel as claimed in claim 1.

13. A method for producing a compressor wheel for a compressor of a turbocharger, which comprises a hub and a multiplicity of blades on the hub, wherein in intermediate spaces of the multiplicity of blades a channel is in each case formed between a suction side and a pressure side, the channel guiding fluid that flows in axially in relation to a rotation axis and radially or radially-axially outward, wherein the hub in relation to the rotation axis is contoured such that the hub has a rotationally symmetrical portion and a non-rotationally symmetrical portion, wherein on the non-rotationally symmetrical portion a transition between the hub and each of the blades is embodied with a radiused connection and facing the suction side has a region of modified thickness, wherein generated in at least one channel between the suction side and the pressure side on the hub is a region extending between a peripheral edge of the hub and the transition, and wherein the region extending between the peripheral edge of the hub and the transition is formed by linear control rays arranged at discrete positions within the at least one channel between the suction side and the pressure side on the hub.

14. The method as claimed in claim 13, wherein one or a plurality of further intermediate spaces of the multiplicity of blades are subsequently machined to achieve one or a plurality of further regions formed by linear control rays.

15. The method as claimed in claim 14, wherein elevations of machining by milling previously created are reduced or completely removed.

16. The method as claimed in claim 13, wherein elevations of machining by milling previously created are reduced or completely removed.

* * * * *